J. MILLS.
NUT LOCK.
APPLICATION FILED OCT. 26, 1909.
971,549.
Patented Oct. 4, 1910.
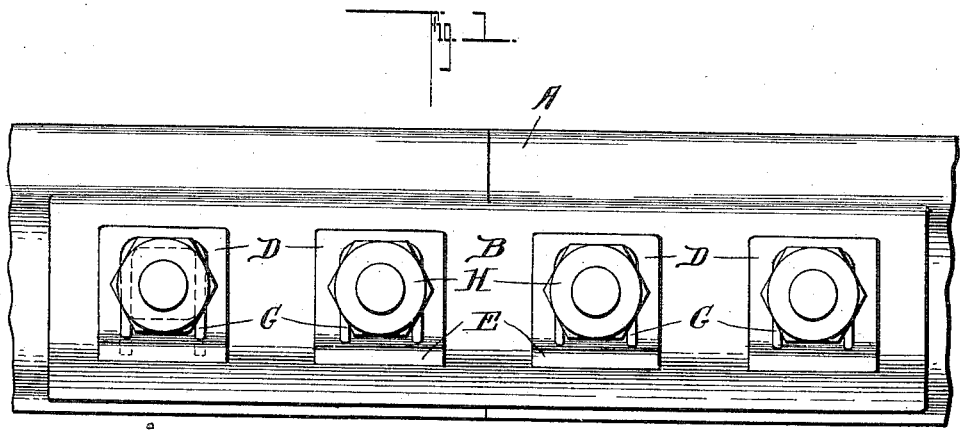
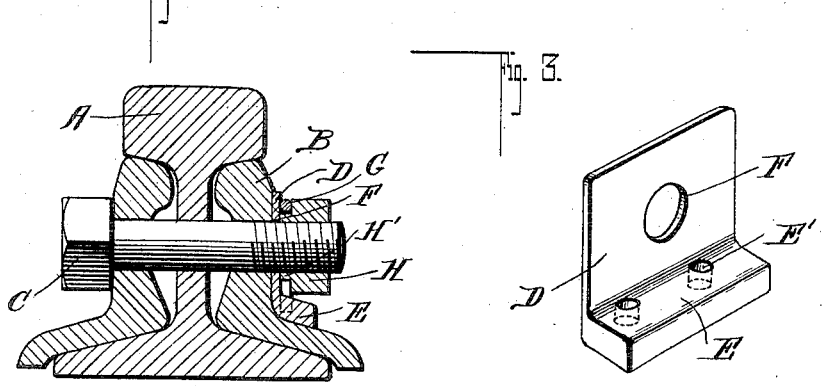
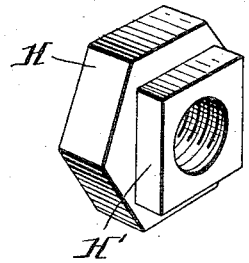
Witnesses
Philip H. Burch
Inventor
J. Mills,
By
Attorneys

UNITED STATES PATENT OFFICE.

JACOB MILLS, OF LOS ANGELES, CALIFORNIA.

NUT-LOCK.

971,549.  Specification of Letters Patent.  Patented Oct. 4, 1910.

Application filed October 26, 1909.  Serial No. 524,622.

*To all whom it may concern:*

Be it known that I, JACOB MILLS, a citizen of the United States, residing at Los Angeles, in the county of Los Angeles and State of California, have invented a new and useful Improvement in Nut-Locks, of which the following is a specification.

This invention relates to nut locks especially adapted to be used on rail joints, the object being to provide a nut lock which is so constructed that the nut will be securely locked so that all danger of the same working loose in any way is prevented.

Another object of my invention is to provide a nut lock comprising an angled washer plate adapted to rest against the side of the fish plate, said washer plate being provided with an opening to receive the bolt and having openings to receive a locking pin which straddles the nut.

A further object of the invention is to provide a nut lock which is exceedingly simple and cheap in construction and one which can be easily and quickly placed in position or removed, and one that will hold the nut in such a manner that it will be impossible for the same to move in any way.

A still further object of my invention is to provide a nut lock which is composed of a very few parts which are so arranged with respect to each other that the locking pin will be held in its seat by gravity and frictional contact with the nut.

Figure 1 is a side elevation of a rail joint showing the application of my improved nut lock. Fig. 2 is a vertical transverse section through Fig. 1. Fig. 3 is a perspective view of my improved washer plate. Fig. 4 is a perspective view of the locking pin, and Fig. 5 is a rear perspective of the nut.

Referring to the drawing A indicates the meeting ends of a pair of rails upon the opposite sides of which are arranged fish plates B having openings through which bolts C extend as clearly shown in Fig. 2, the above description being given so that the operation of my improved nut lock can be readily understood.

In carrying out my improved invention, I employ an angled washer plate D having a thickened horizontal base portion E and an apertured vertical portion F adapted to be arranged over one of the bolts C against the outer face of the fish plate, the horizontal portion E resting on the horizontal portion of the fish plate as clearly shown in Fig. 2.

The thickened or enlarged portion E of the washer plate D is provided with vertical openings E' forming sockets in which are adapted to fit the ends of a substantially inverted U-shaped locking pin G which is adapted to straddle the nut H arranged upon the bolt C and the nut H is formed with a reduced inner face forming a square portion H' over which the pin G is adapted to fit snugly and it will be seen that when the pin is placed in position as clearly shown it will be impossible to turn the nut in any way. The square portion H' is of such a size that when the nut is tightened before the pin has been inserted a space will be left between the washer plate and nut so that the pin can be readily inserted and it is of course understood that the nut could be formed of such a shape that the pin could be arranged over the same without reducing it.

In applying my improved nut lock to the bolt, the washer plate is placed over the same against the fish plate after the bolts have been placed in position and by placing the nut H upon the bolt and tightening the same so as to securely clamp the meeting ends of the rails between the fish plates, they will be securely held together. The nuts are then placed in position upon the bolt so that the vertical and horizontal portions of the reduced portions of the nuts will be in such a position that the inverted U-shaped pin can be readily placed over the same and by forcing or driving the pins downwardly the ends of the pins can be forced into the recesses or sockets of the washer plates so as to securely fasten the same over the nuts so that the nuts will be held in a fixed position. By this arrangement, it is only necessary to insert a sharp instrument under the pin in order to remove the same so that the nut can be readily removed and it will be seen that when the pin is in a locked position, it is held between the inner face of the nut and outer face of the washer by frictional contact as well as gravity as the space between the washer plate and nut is of such a size that it is necessary to drive the pin to a certain extent in order to force the same in position.

Having thus fully described my invention, what I claim as new and desire to secure by Letters Patent, is:

A nut lock for rail joints comprising an angled washer plate adapted to be arranged over the face of the fish plate, said washer plate being provided with a thickened horizontal portion having spaced vertical openings forming sockets, and an apertured vertical portion adapted to receive the securing bolt of the rail joint, a nut mounted on said securing bolt having a reduced inner face forming a square portion, and a substantially U-shaped locking pin having a diameter in cross section slightly larger than the width of the square portion of said nut, said pin being adapted to straddle said square portion having its lower ends seated in the socket of the washer plate, whereby said pin will be held between the washer plate and the nut after being driven into position.

JACOB MILLS.

Witnesses:
WM. R. SLATER,
JOHN H. GISH.